March 6, 1962     T. E. LOHR     3,023,854
CONTINUOUS BRAKE FOR A WINDOW DRIVE MECHANISM
Filed April 19, 1957     2 Sheets-Sheet 1
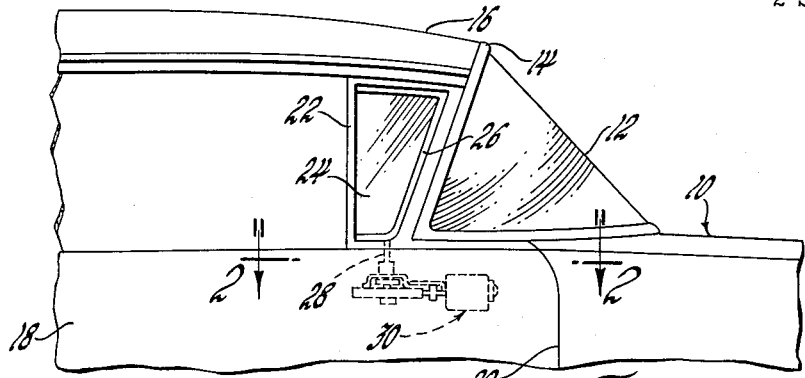
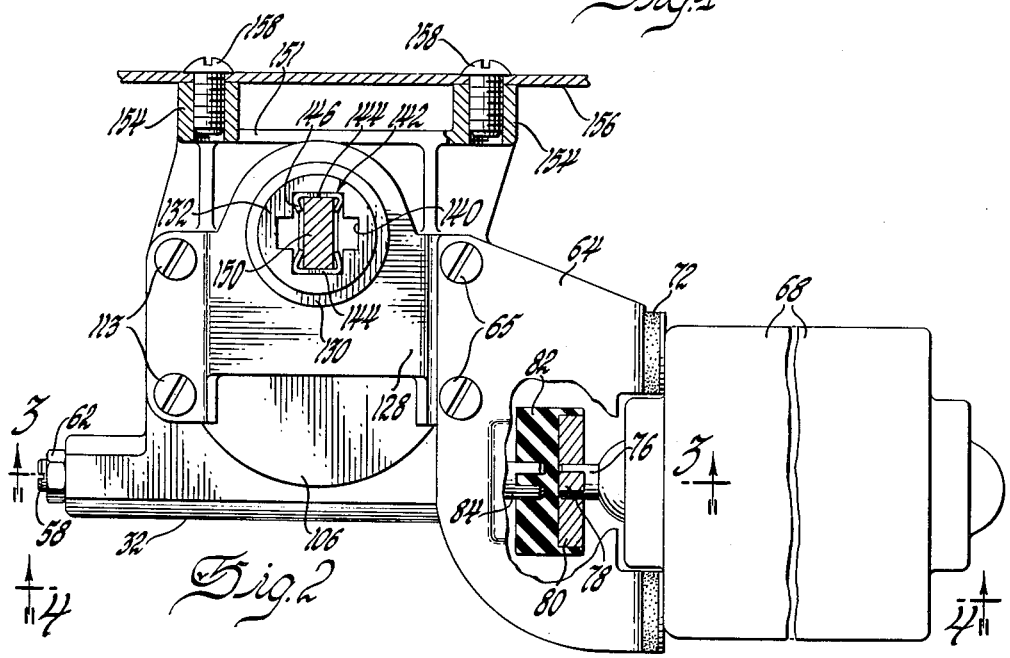
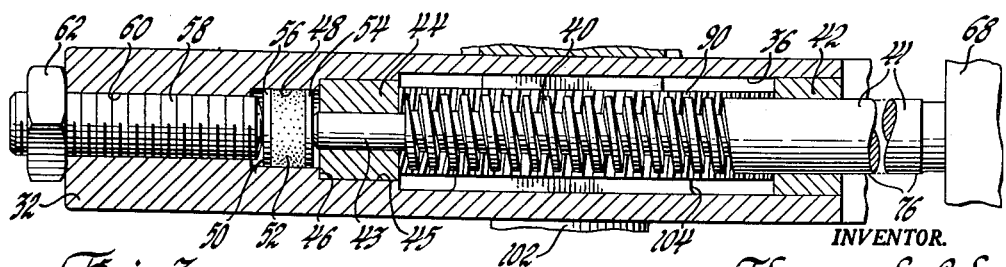
INVENTOR.
Thomas E. Lohr
BY
W. S. Pettigrew
ATTORNEY

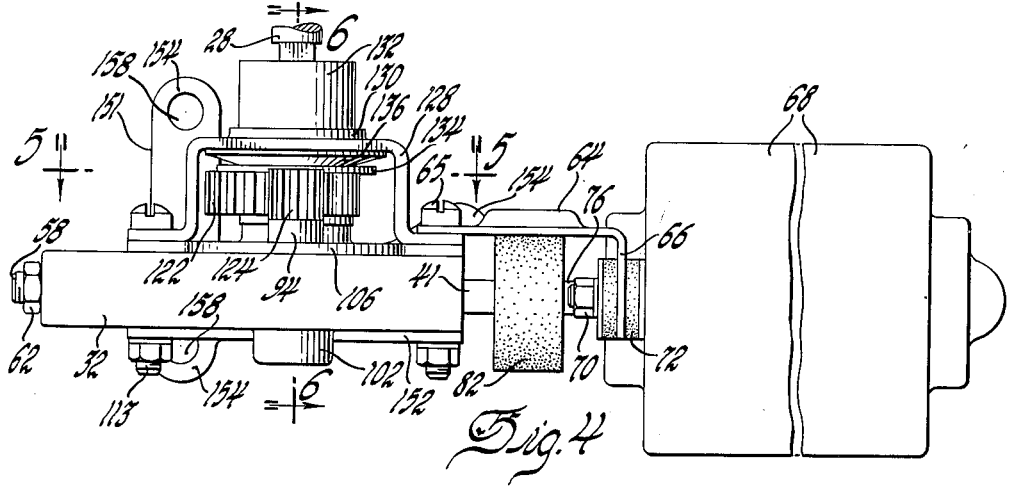
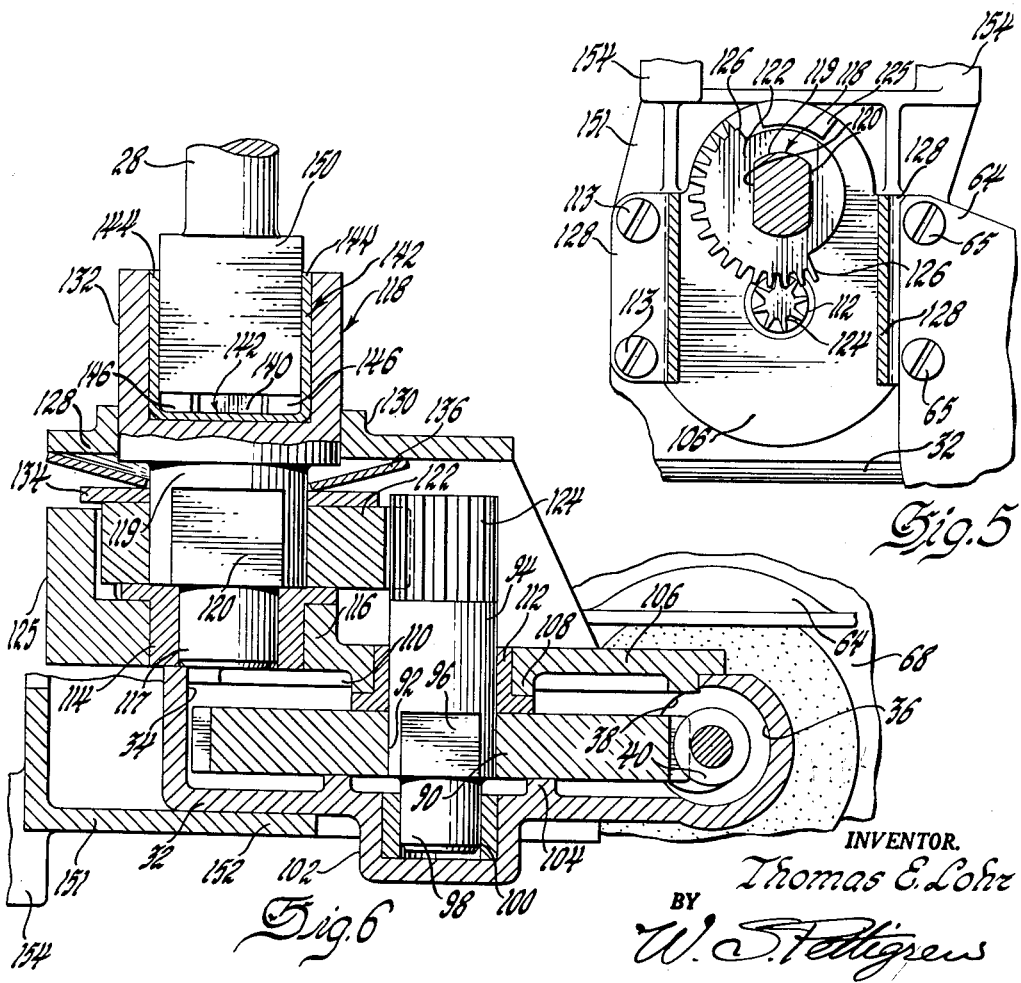

United States Patent Office 3,023,854
Patented Mar. 6, 1962

3,023,854
CONTINUOUS BRAKE FOR A WINDOW DRIVE MECHANISM
Thomas E. Lohr, Detroit, Mich., assignor to General Motors Corporation, Detroit, Mich., a corporation of Delaware
Filed Apr. 19, 1957, Ser. No. 653,800
2 Claims. (Cl. 188—83)

This invention relates to a window drive mechanism, and more particularly to a window drive mechanism for power operated vehicle ventilation windows.

The drive mechanism of this invention offers several distinct advantages over presently known and used mechanisms. One advantage is in the arrangement of the gear mechanism and electric motor in a compact unitary assembly which may be mounted on the vehicle as a unit but may be easily disassembled in various component parts for repairs without necessarily removing the entire unit from the body.

Another advantage is in the axial thrust take-up means for the worm in the worm and worm wheel drive of the gear mechanism. The axial thrust take-up means accurately positions the worm so that there will be no slippage between the worm and worm wheel and yet takes up axial thrust in either direction during rotation of the worm.

A further advantage is in the frictional clutch means to hold the window drive shaft in any rotative position thereof upon non-operation of the power operating means to thereby prevent forceful movement of the window by the operator or otherwise. In past mechanisms, the frictional clutch means has often included a strap which engaged the drive shaft of the window and had its ends secured to the housing or support for the mechanism. At least one end of the strap had to be adjustable in order to adjust the frictional force with which the strap engaged the drive shaft. Since the area of contact between the strap and shaft was relatively small, the strap had to be held against the shaft with an extremely high force in order to hold the shaft in rotative position. This often caused undue wear of the shaft and extremely hard operation of the shaft by the power operating means.

The frictional clutch means of this invention includes a Belleville spring which is slidably and rotatably mounted on the drive shaft and has inner and outer edge portions bearing respectively against a washer fixed to the shaft and a bracket secured to the housing to thereby provide the required frictional force between the drive shaft and housing to hold the shaft in any rotative position. Since the spring does not bear against the drive shaft, there is no possibility of undue wear of the shaft. In addition, although there is a large total area of contact between the spring and the bracket and washer, this area is equally distributed for less local wear and more effective distribution of the required frictional force.

Yet another feature of the invention is in the coupling means between the mechanism drive shaft and the window drive shaft. The drive shaft of the mechanism is provided with an axially directed outwardly opening slot which receives a generally U-shaped spring clip. The opposite legs of the clip are provided with lateral legs which converge to define opposite spaced openings of less extent than the width of the slot. The window drive shaft is provided with a flattened end which is received by the converging lateral legs of the clip to thereby couple the drive shafts. If the shafts are misaligned, the clip will allow this misalignment and yet provide a driving connection therebetween. Also, if axial adjustment of one shaft relative to another is necessary in order to couple the shafts after assembly, the clip allows this axial adjustment without disturbing the drive connection. Further, since the flattened end of the window drive shaft is of less width than the width of the opening in the mechanism drive shaft, there is no need for any critical manufacturing tolerances on either shaft, since the spring clip will take up these tolerances.

Further advantages of the drive mechanism of this invention will be readily apparent from the following specification and drawings wherein:

FIGURE 1 is a partial side elevational view of a vehicle body embodying a window drive mechanism according to this invention;

FIGURE 2 is an enlarged sectional view taken on the plane indicated by line 2—2 of FIGURE 1, with parts thereof broken away for clarity of illustration;

FIGURE 3 is a sectional view taken on the plane indicated by line 3—3 of FIGURE 2;

FIGURE 4 is a view taken on the plane indicated by line 4—4 of FIGURE 2;

FIGURE 5 is a sectional view taken on the plane indicated by line 5—5 of FIGURE 4; and FIGURE 6 is an enlarged sectional view taken on the plane indicated by line 6—6 of FIGURE 4.

Referring now particularly to FIGURE 1 of the drawings, a vehicle 10 includes a windshield 12, a windshield header 14 and a roof 16. A front door 18 is hinged at its forward edge 20 on the vehicle 10 for swinging movement between open and closed positions to provide access to the body. A window frame 22 extends upwardly from door 18 to the roof 16 of the body and provides a support for a swingably mounted ventilation window 24 movable between a closed position, as shown, and an open position transverse of frame 22, not shown. The ventilation window is mounted within a frame 26 which is pivotally secured to frame 22 by an upper pivot (not shown) and a lower pivot provided by a window drive shaft 28. The upper and lower pivots define the vertical axis of swinging movement of the window. The drive shaft 28 is rigidly secured to the frame 26 and journaled within door 18 so as to drive the window 24 between open and closed positions upon operation of the window drive mechanism 30.

Referring now to FIGURES 2 through 6 of the drawings, the drive mechanism 30 for the window 24 will be described. A housing 32 includes an upwardly opening vertical bore 34 and a horizontal bore 36 which opens to bore 34 at 38. As may be seen best in FIGURE 3, a worm 40 is positioned within bore 36, with one end 41 of the worm shaft being rotatably supported therein by a plain bearing 42 fixedly secured within bore 36 adjacent one end thereof. The other end 43 of the worm shaft is of reduced diameter and is rotatably mounted within a plain bearing 44 fixedly secured within a reduced portion 45 of bore 36 in engagement with a shoulder 46. A reduced portion 48 of bore 36 immediately adjacent the reduced portion 45 slidably receives a thrust member 50. The thrust member 50 includes an intermediate circular member 52 of nylon or other deformable material which is provided with opposite metal end plates 54 and 56 secured thereto. The end plate 54 engages the adjacent end 43 of the worm shaft and the end plate 56 engages an adjusting screw 58 which is threaded within a threaded bore 60 of the housing and locates the member 50 in engagement with the end 43 of the worm shaft. A lock nut 62 holds the screw 58 in any adjusted position.

As may be seen best in FIGURES 2 and 4, a bracket 64 is bolted at 65 to the housing 32 and includes a spaced pair of laterally extending apertured legs 66. An electric motor 68 is bolted at 70 to each leg 66. A resilient washer 72 is provided on each side of each leg 66 to provide for resiliently mounting the motor on the bracket and also to prevent the vibration of the motor being transferred to the door inner panel which supports the mechanism 30 as will be described. The armature shaft 76 of the motor terminates in a slotted end 78 which is received within a similar shaped opening on a metal plate 80 to secure the armature of the motor to the plate. Plate 80 is bonded to a circular member 82 of rubber or other elastomeric material. The end 41 of the worm shaft is provided with a bifurcated portion 84 which is received within spaced openings in member 82 to couple the worm to the armature shaft of the motor.

As will be hereinafter described, the worm 40 drives a worm wheel which is part of the gear drive train between the motor 68 and the window drive shaft 28. It is desirable that the worm 40 be held against any axial movement so as to prevent any slippage between the helical thread of the worm and the teeth of the worm wheel. It is also desirable that some means be provided to take up axial thrust loads of the worm in either direction. It is further desirable to provide a resilient torsional coupling between the worm and the armature shaft of the motor so that overtravel of the motor will not bend or break any of the parts of the gear drive train when the window has reached a limit position in its movement.

The member 82 of rubber or other elastomeric material provides the resilient torsional coupling between the armature shaft of the motor and the worm and takes up any overtravel of the motor when the window has reached a limit position. This member also acts to take up axial thrust of the worm 40 in the one direction towards the armature of the motor. Although the member 82 is of rubber or other elastomeric material, the rubber or other material is of the type which is not readily compressible so as not to be easily compressed under light axial thrust loads. Thus, the member 82 will accurately position the one end 41 of the worm shaft under axial thrust loads in the one direction and will prevent any appreciable axial shifting movement of the worm in the one direction except under heavy axial thrust loads.

The member 52 of nylon or other deformable material acts to accurately position the other end 43 of the worm shaft and to take up any axial thrust loads of the worm in an opposite direction. Since nylon or other materials of this type are not easily deformable, light axial thrust loads do not result in any appreciable axial shifting movement of the worm in this opposite direction except under heavy axial thrust loads. Thus the combination of the coupling 82 and the member 52 act to take up axial thrust loads in either direction and to accurately maintain the position of the worm except under heavy thrust loads. The plates 54 and 56 on either side of the member 52 act to distribute the thrust loads of the worm shaft and the load of the adjusting screw 58 uniformly over the member 52 to prevent local deformation.

A worm wheel 90, FIGURE 6, is provided with a central bore 92 having opposite flattened portions receives a shaft 94 having similar opposite flattened portions 96 to rigidly secure the worm wheel to the shaft. The worm wheel meshes with the worm 40 and is driven thereby. Shaft 94 includes an end 98 of reduced diameter which is located and rotatably supported by a plain bearing 100 fixed within a closed boss 102 of housing 32. In addition, an annular rib 104 on the lower wall of bore 34 of the housing provides a thrust bearing for the worm wheel. A cover 106 fits over the opening of bore 34 and is provided with an apertured boss 108 which opens to bore 34 and a rib 110 which is received within the opening of bore 34 to accurately position the cover in place. A plain bearing 112 mounted within boss 108 locates and rotatably supports the other end of shaft 94 which projects outwardly of the cover. The cover is bolted to housing 32 at 65 and also at 113.

A plain bearing 114 mounted within an apertured boss 116 of the cover locates and rotatably supports one end 117 of reduced diameter of a mechanism drive shaft 118. The portion 119 of larger diameter of the drive shaft 118 is provided with opposite flattened sides 120 and is received within a central opening of the same shape in a sector 122 to secure the sector to the shaft. The sector 122 meshes with a pinion 124 which is fixed to shaft 94. As may be seen best in FIGURE 5, the cover 106 is provided with an upwardly extending lug 125 adjacent the boss 116. The circumferentially spaced shoulders 126 of the sector are engageable with opposite sides of the lug to act as limit stops fixing the limit positions of the window.

As may be seen best in FIGURES 2, 5 and 6, a U-shaped bracket 128 bolted to the housing 32 at 65 and 113 is provided with a flanged opening 130 which rotatably receives and locates the enlarged end 132 of shaft 118. A washer 134 is provided with a central opening of the shape of portion 119 of shaft 118 so as to be fixed thereto. A Belleville spring 136 is slidably and rotatably mounted on portion 119 of shaft 118 and has its outer and inner edge portions under compression against bracket 128 and washer 134, respectively. The bearing spring provides a frictional coupling between the shaft 118 and the drive mechanism housing through bracket 128 so as to frictionally hold the shaft in any rotative position as will be further described.

Since the Belleville spring 136 does not frictionally bear against the shaft 118, there is no possibility of undue wear of the shaft. In addition, it will be noted that only the inner and outer edge portions of the spring bear against the washer 134 and the bracket 128 respectively, so that the immediate area of contact between any portion of the edge portions of the spring and either the bracket or washer 134 is relatively small. However, the total area of frictional engagement is rather large. In addition, since these total areas of engagement of the inner and outer edge portions of the spring 136 are concentrically located, a more effective frictional force is provided to hold the shaft 118 in any rotative position thereof.

Referring now particularly to FIGURES 2 and 6 of the drawings, the enlarged end 132 of shaft 118 is provided with a cruciform shaped slot 140. A generally U-shaped spring clip 142 fits within opposite legs of the slot 140 and conforms substantially to the contour of the slot between these legs, as may be seen particularly in FIGURE 6. Each of the opposite legs 144 of the clip is resiliently connected to the base thereof so as to be biased outwardly against opposite end walls of the opposite legs of the slot 140. As may be seen best in FIGURE 2, each of the legs 144 is provided with a pair of converging legs 146 with the extremity of these legs defining an opening of less width than the width of the opposite legs of the slot 140 receiving the spring clip. In addition, the legs 146 join each of the legs 144 on a curved juncture so that the legs 146 may be wedged between the opposite side walls of each of the opposite legs of slot 140 to additionally hold the clip in place.

As shown best in FIGURE 2 of the drawings, the lower end of the window drive shaft 28 is flattened to provide a flattened end portion 150 which is slightly larger than the openings defined by the converging legs 146 of the spring clip so as to be wedgingly received between the opposite pairs of legs. Since the legs 146 are resiliently connected to each of the legs 144, it is not necessary for the window drive shaft 28 to be axially aligned with the mechanism drive shaft 118, since the legs 146 will take up any misalignment between the shafts. In addition, as will be described, the drive mechanism 30 is fixedly mounted on the door inner panel below the window 24 and the lower end of the window drive shaft 28 may not terminate exactly at the base of the clip 142, as indicated in FIGURE 6. However, even under such conditions, the spring clip will still provide a driving connection between the mechanism drive shaft 118 and the window drive shaft 28. Thus there is no need for any substantial adjustment of the window drive mechanism 30 relative to the shaft 28 in order to adequately establish a driving connection between the shaft of the mechanism.

As best seen in FIGURES 5 and 6, an angular mounting bracket 151 includes a pair of laterally extending spaced legs 152 which receive the boss 102 of housing 32 therebetween and are bolted at 65 and 113 to the drive mechanism. The mounting bracket 151 further includes a number of threaded bosses 154 which extend laterally thereto and are adapted to bear against the inner panel 156 of door 18, as best shown in FIGURE 2. Bolts 158 which extend through apertures in the inner panel and are threaded within bosses 154 mount the drive mechanism on the door in a unitary assembly.

It will be noted that the component parts of the drive mechanism are secured together solely by the bolts 65 and 113 so that the assembly may be easily disassembled into its component parts without necessarily removing the entire unit from the door 18. If replacement or repairs are required for the motor 68, removal of the bolts 70 allows the motor to be detached from the assembly. If any repairs are needed internally of the mechanism, removal of the bolts 65 and 113 allow the entire drive mechanism to be easily disassembled without removing the mounting bracket 151 from within the door.

Since the operation of the drive mechanism is believed to be apparent from the foregoing description, only a brief description of the operation will be given. Upon operation of the motor 68 in the required direction, the worm 40 will drive the worm wheel 90 and in turn rotate the shaft 94. As the shaft 94 rotates, the pinion 124 will drive the sector 122 and in turn drive the mechanism drive shaft 118. The mechanism drive shaft will then drive the window drive shaft 28. When the window has reached a limit position, the engagement of either of the shoulders 126 of the sector 122 with lug 125 will fix the limit positions of the window. When the window is in any stationary position, the Belleville spring 136 will act to prevent any forcible movement of the window to another position by the operator or other persons. In addition, since the window 24 may be disposed in one or more open positions transversely of the opening of frame 22, the Belleville spring 136 will act to hold the window in this position against any wind resistance caused by movement of the vehicle.

Thus this invention provides an improved window drive mechanism having several distinct advantages over presently known and used drive mechanisms.

What is claimed is:

1. In a window drive mechanism, the combination comprising, a support, a shouldered drive shaft including axially spaced portions of varying diameter, one of said portions being journaled on said support to rotatably mount said shaft thereon, a shaft support member mounted on said support and rotatably supporting another portion of said shaft, drive gear means slidably and non-rotatably mounted on a further portion of said shaft adjacent said one portion thereof and being located thereon by said support, a friction washer slidably and non-rotatably mounted on said shaft and bearing against said drive gear means for rotation therewith, means on said another portion of said shaft adapted to be operatively connected to a window pivot shaft, and a resilient axially compressible spring washer slidably and rotatably surrounding said further portion of said shaft and having inner and outer peripheral edge portions bearing concentrically against said friction washer and said shaft support member to frictionally hold said drive shaft and window pivot shaft in any rotative position thereof against movement.

2. In a window drive mechanism, the combination comprising, a support, a shouldered drive shaft including axially spaced portions of varying diameter, one of said portions being journaled on said support to rotatably mount said shaft thereon, a shaft support member mounted on said support and rotatably supporting another portion of said shaft, drive gear means mounted on a further portion of said shaft adjacent said one portion thereof, a friction washer mounted on said further portion of said shaft between said shaft support member and said drive gear means and bearing against said drive gear means, said another portion of said shaft including an axially opening bore adapted to receive an end of a window pivot shaft and be operatively connected thereto, and a resilient axially compressible spring washer slidably and rotatably surrounding said further portion of said shaft and having inner and outer peripheral edge portions bearing concentrically against said friction washer and said shaft support member to frictionally hold said drive shaft and window pivot shaft in any rotative position thereof against movement.

References Cited in the file of this patent

UNITED STATES PATENTS

| | | |
|---|---|---|
| 1,306,541 | Herrshoff | June 10, 1919 |
| 1,781,083 | Schmick | Nov. 11, 1930 |
| 2,100,232 | Barry | Nov. 23, 1937 |
| 2,173,660 | Perkins | Sept. 19, 1939 |
| 2,277,134 | Nelson | Mar. 24, 1942 |
| 2,332,731 | Lakin | Oct. 26, 1943 |
| 2,375,098 | Geczy | May 1, 1945 |
| 2,444,485 | Aitcheson | July 6, 1948 |
| 2,548,174 | Rastler | Apr. 10, 1951 |
| 2,554,346 | Reid | May 22, 1951 |
| 2,560,015 | Waldron | July 10, 1951 |
| 2,568,245 | McDonald | Sept. 18, 1951 |
| 2,641,139 | Beisner | June 9, 1953 |
| 2,687,792 | Laugle | Aug. 31, 1954 |
| 2,699,230 | Pfalzgraff et al. | Jan. 11, 1955 |
| 2,773,655 | Mandolf | Dec. 11, 1956 |
| 2,783,861 | Jungles | Mar. 5, 1957 |
| 2,889,012 | Pierce | June 2, 1959 |